US009319868B2

(12) United States Patent
Yang et al.

(10) Patent No.: US 9,319,868 B2
(45) Date of Patent: Apr. 19, 2016

(54) STATE CHANGE SENSING BASED ON INDIVIDUAL LOCATION PATTERNS

(75) Inventors: Guang Yang, San Jose, CA (US); Du Li, Palo Alto, CA (US); Yifei Jiang, Longmont, CO (US); Zhigang Liu, Sunnyvale, CA (US)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 13/825,364

(22) PCT Filed: Sep. 23, 2010

(86) PCT No.: PCT/IB2010/054299
§ 371 (c)(1),
(2), (4) Date: Jul. 31, 2013

(87) PCT Pub. No.: WO2012/038781
PCT Pub. Date: Mar. 29, 2012

(65) Prior Publication Data
US 2013/0303184 A1    Nov. 14, 2013

(51) Int. Cl.
| H04W 8/22 | (2009.01) |
| H04W 64/00 | (2009.01) |
| G01S 5/02 | (2010.01) |
| G01S 19/48 | (2010.01) |

(52) U.S. Cl.
CPC ............... *H04W 8/22* (2013.01); *G01S 5/0263* (2013.01); *G01S 19/48* (2013.01); *H04W 64/006* (2013.01)

(58) Field of Classification Search
CPC .... H04W 8/22; H04W 64/006; G01S 5/0263; G01S 19/48
USPC .................... 455/456.1-456.6, 574, 418-420
See application file for complete search history.

(56) References Cited

U.S. PATENT DOCUMENTS

| 6,363,255 | B1 * | 3/2002 | Kuwahara ................. 455/456.5 |
| 7,096,030 | B2 * | 8/2006 | Huomo ..................... 455/456.3 |
| 7,319,413 | B1 * | 1/2008 | Denker et al. ................ 340/988 |
| 2006/0240842 | A1 | 10/2006 | Spain, Jr. et al. |

(Continued)

FOREIGN PATENT DOCUMENTS

EP    2046087 A1    4/2009

OTHER PUBLICATIONS

Constandache et al., "EnLock: Energy Efficient Localization for Mobile Phones", IEEE, 2009, pp. 2716-2720.
Hightower et al., "Learning and Recognizing the Places We Go," UbiComp 2005, LNCS 3660, pp. 159-176.
Kim et al., "SensLoc: Sensing Everyday Places and Paths Using Less Energy," SenSys 2010, pp. 43-56.

(Continued)

*Primary Examiner* — Brandon Miller
(74) *Attorney, Agent, or Firm* — Locke Lord LLP

(57) ABSTRACT

A system for detecting state transitions when apparatuses move between significant places or routes without having to employ high resolution, and high energy cost, localization technologies. Apparatuses may receive position information via lower resolution/lower energy cost localization resources, and this information may be used to determine whether the current position of the apparatus corresponds to a significant place or route. If the apparatus is determined to be positioned in a significant place or route, a further determination may be made as to whether at least one second level classifier exists for the significant place or route. Second level classifiers may be utilized to determine when apparatuses transition from one state (e.g., one significant place or route) to another. Upon detection of a state transition based on the second level classifier, a new localization configuration may be applied in the apparatus.

24 Claims, 9 Drawing Sheets

(56) References Cited

U.S. PATENT DOCUMENTS

| | | |
|---|---|---|
| 2007/0026866 A1* | 2/2007 | Krishnamurthi et al. ..... 455/440 |
| 2007/0248032 A1* | 10/2007 | Vasudevan et al. ........... 370/315 |
| 2008/0274728 A1* | 11/2008 | Anderson et al. ............. 455/423 |
| 2009/0068970 A1* | 3/2009 | Ahmed et al. ............. 455/161.1 |
| 2009/0181695 A1* | 7/2009 | Wirola et al. ............. 455/456.1 |
| 2010/0127883 A1* | 5/2010 | Chou ........................ 340/686.1 |
| 2010/0175116 A1* | 7/2010 | Gum ................................. 726/6 |
| 2010/0231383 A1* | 9/2010 | Levine et al. ................. 340/540 |
| 2011/0070863 A1* | 3/2011 | Ma et al. ...................... 455/410 |
| 2011/0159884 A1* | 6/2011 | Chawla ..................... 455/456.1 |

OTHER PUBLICATIONS

Kim et al., "Discovering Semantically Meaningful Places from Pervasive RF-Beacons", UbiComp 2009 pp. 1-10.

Guang Yang, "Discovering Significant Places from Mobile Phones—A Mass Market Solution", MELT 2009, LNCS, 5801, pp. 34-49.

Phung, D., et al., "Unsupervised Context Detection Using Wireless Signals," Pervasive and Mobile Computing, No. 5, Dec. 2009, pp. 714-733.

International Search Report and Written Opinion completed May 26, 2011 in International Application Serial No. PCT/IB2010/054299, 11 pp.

* cited by examiner

FIG. 5

| Timestamp | GPS Readings (latitude, longitude) | Wi-Fi Readings (MAC address) | Cellular ID Readings (mcc, mnc, lac, cid) |
|---|---|---|---|
| 1234567890 | 37.1234, -122.5678 | 01:23:45:67:89:AB<br>12:34:56:78:9A:BC | (310, 410, 567, 123) |
| 1234567900 | None | 01:23:45:67:89:AB<br>23:45:67:89:AB:CD | (310, 410, 567, 123) |
| 1234567910 | 37.1237, -122.5682 | None | (310, 410, 567, 123) |
| 1234567920 | 37.1239, -122.5684 | 56:78:9A:BC:DE:FF | None |
| ... | ... | ... | ... |
| 1234568710 | 37.1567, -122.5345 | FE:DC:BA:98:76:54 | (310, 410, 568, 567) |
| 1234568720 | 37.1568, -122.5343 | FE:DC:BA:98:76:54<br>ED:CB:A9:87:65:43<br>DC:BA:98:76:54:32 | (310, 410, 568, 678) |
| ... | ... | ... | ... |

| Timestamp | GPS Readings (latitude, longitude) | Wi-Fi Readings (MAC address) | Cellular ID Readings (mcc, mnc, lac, cid) | Place/Route Label |
|---|---|---|---|---|
| 1234567890 | 37.1234, -122.5678 | 01:23:45:67:89:AB<br>12:34:56:78:9A:BC | (310, 410, 567, 123) | Home |
| 1234567900 | None | 01:23:45:67:89:AB<br>23:45:67:89:AB:CD | (310, 410, 567, 123) | Home |
| 1234567910 | 37.1237, -122.5682 | None | (310, 410, 567, 123) | Home -> Work, Route #1 |
| 1234567920 | 37.1239, -122.5684 | 56:78:9A:BC:DE:FF | None | Home -> Work, Route #1 |
| ... | ... | ... | ... | ... |
| 1234568710 | 37.1567, -122.5345 | FE:DC:BA:98:76:54 | (310, 410, 568, 567) | Home -> Work, Route #1 |
| 1234568720 | 37.1568, -122.5343 | FE:DC:BA:98:76:54<br>ED:CB:A9:87:65:43<br>DC:BA:98:76:54:32 | (310, 410, 568, 678) | Work |
| ... | ... | ... | ... | ... |

700

STATE CHANGE SENSING BASED ON INDIVIDUAL LOCATION PATTERNS

BACKGROUND

1. Field of Invention

The present invention relates to electronic positioning, and in particular, to collecting location information over time for use in detecting apparatus state transitions.

2. Background

The integration of wireless communication functionality into both existing and emerging applications continues to expand. Strong demand has spurred developers to not only create more powerful communication devices, but also to introduce other helpful applications that rely upon wireless communication for support. In this manner, wireless communication has moved beyond the mere conveyance of voice data, and has evolved to make possible various applications for personal productivity, business, entertainment, etc.

At least one popular communication-based application that has emerged is electronic positioning. Electronic positioning may provide current location information for apparatuses in terms of coordinates, in relation to visual presentation (e.g., map), etc. However, the means for obtaining information upon which a position is determined may vary. For example, apparatuses may include Global Positioning System (GPS) receivers for obtaining location information (e.g. coordinates) from satellites. Long-range wireless communication systems may also support location estimation based on cell membership or even more specific location via methods such as cell-based triangulation. Short-range wireless systems are also emerging that may be able to provide location information via determinations of proximity (e.g., distance and direction) from wireless access points, etc.

Each of the aforementioned information sources for apparatus localization (e.g., positioning) have certain characteristics that make their utilization more appropriate in different situations. For example, GPS is known to provide refined position resolution, but this enhanced resolution may come at the cost of higher processing and energy burden when compared to other positioning technologies. On the other end of the spectrum, cell membership may provide localization much more efficiently, but at a substantially lower position resolution. Often, the selection of positioning technology is at the whim of the user. Users often may select the best available technology without considering the effect of utilization on apparatus resources, leaving these users to wonder why apparatuses need to be recharged so frequently. Existing automated positioning control systems offer only marginal improvement. Such solutions are implemented using generic algorithms that act in the same manner regardless of apparatus, user habits, tendencies, current situation, etc.

SUMMARY

Example embodiments of the present invention may be directed to a method, computer program product, apparatus and system for detecting state transitions when apparatuses move between significant places or routes without having to employ high resolution, and high energy cost, localization technologies. Apparatuses may receive position information via lower resolution/lower energy cost localization resources, and this information may be used to determine whether the current position of the apparatus corresponds to a significant place or route. If the apparatus is determined to be positioned in a significant place or route, a further determination may be made as to whether at least one second level classifier exists for the significant place or route. Second level classifiers may be utilized to determine when apparatuses transition from one state (e.g., one significant place or route) to another. Upon detection of a state transition based on the second level classifier, and in some instances verification of the state change based on a first level classifier, a new localization configuration may be applied in the apparatus.

In at least one example implementation, apparatuses may receive position information via a lower resolution localization technology such as the identification of a current cellular membership for the apparatus. If, based on the position information, the apparatus determines that it is not in a previously classified significant place or route, it may make a determination as to whether the current position should be classified as a significant place or route. Such determinations may be based on historical information accumulated in the apparatus over time. An existing classifier (e.g., first level classifier) or a new classifier may then be applied to the place or route. A determination may then be made as to whether at least one second level classifier exists for the significant place or route. Second level classifiers may be formulated in instances where none already exist.

Second level classifiers, in accordance with at least one embodiment of the present invention, may be based on further characteristics that are defined with respect to significant places or routes. For example, data mining techniques may be used to form n-element n-grams incorporating characteristics like duration of time spent in a significant place or route. These data structures may be utilized to form second level classifiers used to determine when an apparatus is transitioning from one state to another. The detection of a state change may be triggered in accordance with a second level classifier, and may further be verified by reapplying a first level classifier to verify the state transition. For example, a determination may be made in view of a first level classifier as to whether the apparatus has moved into a new significant place or route. If verified, a new localization configuration for the new significant place or route may be applied in the apparatus.

The foregoing summary includes example embodiments of the present invention that are not intended to be limiting. The above embodiments are used merely to explain selected aspects or steps that may be utilized in implementations of the present invention. However, it is readily apparent that one or more aspects, or steps, pertaining to an example embodiment can be combined with one or more aspects, or steps, of other embodiments to create new embodiments still within the scope of the present invention. Therefore, persons of ordinary skill in the art would appreciate that various embodiments of the present invention may incorporate aspects from other embodiments, or may be implemented in combination with other embodiments.

DESCRIPTION OF DRAWINGS

The invention will be further understood from the following description of various example embodiments, taken in conjunction with appended drawings, in which:

FIG. 5 discloses example electronic positioning information obtained via various technologies in accordance with at least one embodiment of the present invention.

FIG. 7 discloses an example classification information in accordance with at least one embodiment of the present invention.

DESCRIPTION OF EXAMPLE EMBODIMENTS

Figure 1:
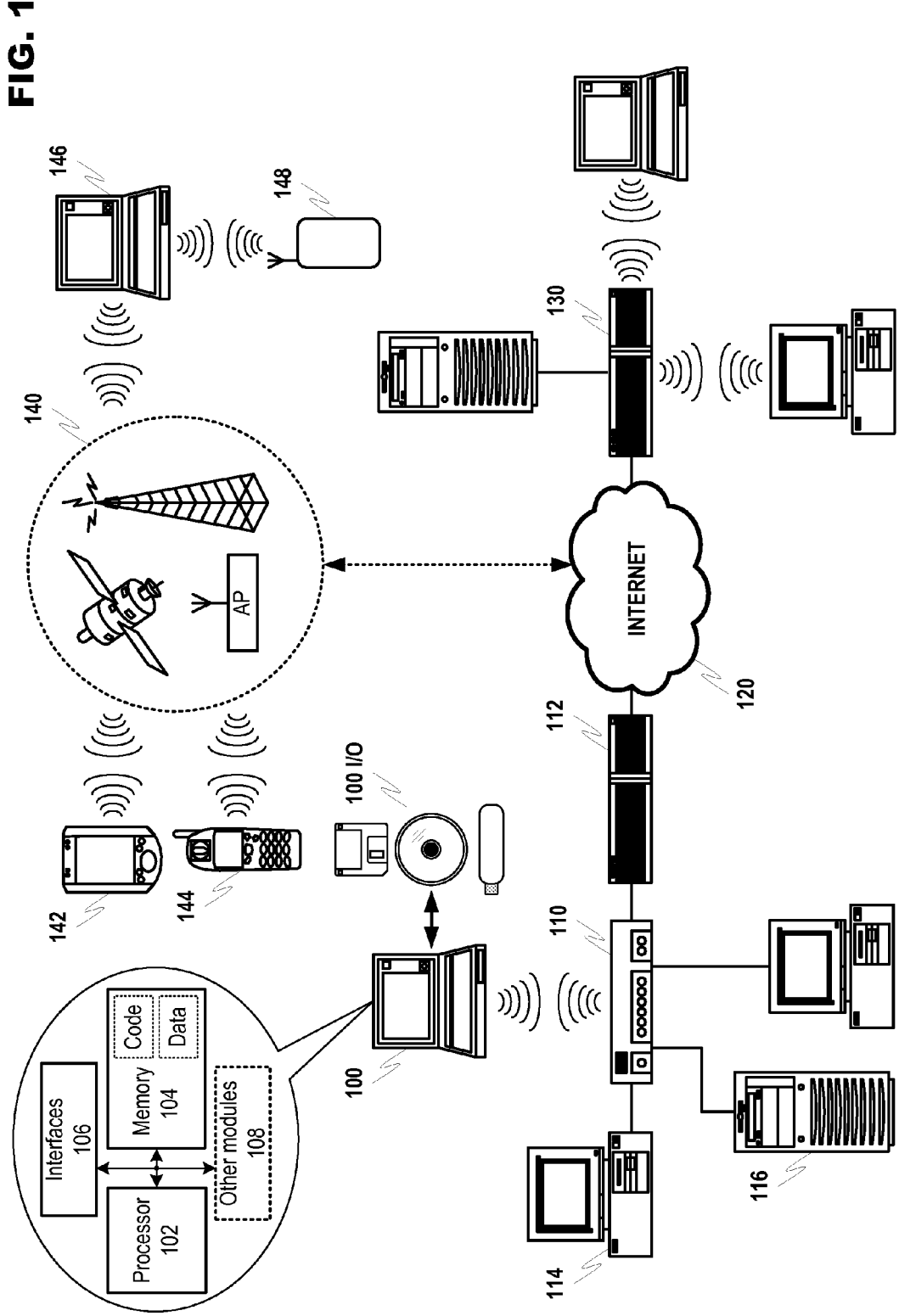
FIG. 1 discloses example apparatuses, communication configuration and network architecture usable with at least one embodiment of the present invention.

While the invention has been described below in terms of a multitude of example embodiments, various changes can be made therein without departing from the spirit and scope of the invention, as described in the appended claims
I. Example System with which Embodiments of the Present Invention may be Implemented An example of a system that is usable for implementing various embodiments of the present invention is disclosed in FIG. 1. The system comprises elements that may be included in, or omitted from, configurations depending, for example, on the requirements of a particular application, and therefore, is not intended to limit present invention in any manner.

Computing device 100 may correspond to various processing-enabled apparatuses including, but not limited to, micro personal computers (UMPC), netbooks, laptop computers, desktop computers, engineering workstations, personal digital assistants (PDA), computerized watches, wired or wireless terminals/nodes/etc., mobile handsets, set-top boxes, personal video recorders (PVR), automatic teller machines (ATM), game consoles, or the like. Elements that represent basic example components comprising functional elements in computing device 100 are disclosed at 102-108. Processor 102 may include one or more devices configured to execute instructions. In at least one scenario, the execution of program code (e.g., groups of computer-executable instructions stored in a memory) by processor 102 may cause computing device 100 to perform processes including, for example, method steps that may result in data, events or other output activities. Processor 102 may be a dedicated (e.g., monolithic) microprocessor device, or may be part of a composite device such as an ASIC, gate array, multi-chip module (MCM), etc.

Processor 102 may be electronically coupled to other functional components in computing device 100 via a wired or wireless bus. For example, processor 102 may access memory 104 in order to obtain stored information (e.g., program code, data, etc.) for use during processing. Memory 104 may generally include removable or imbedded memories that operate in a static or dynamic mode. Further, memory 104 may include read only memories (ROM), random access memories (RAM), and rewritable memories such as Flash, EPROM, etc. Examples of removable storage media based on magnetic, electronic and/or optical technologies are shown at 100 I/O in FIG. 1, and may serve, for instance, as a data input/output means. Code may include any interpreted or compiled computer language including computer-executable instructions. The code and/or data may be used to create software modules such as operating systems, communication utilities, user interfaces, more specialized program modules, etc.

One or more interfaces 106 may also be coupled to various components in computing device 100. These interfaces may allow for inter-apparatus communication (e.g., a software or protocol interface), apparatus-to-apparatus communication (e.g., a wired or wireless communication interface) and even apparatus to user communication (e.g., a user interface). These interfaces allow components within computing device 100, other apparatuses and users to interact with computing device 100. Further, interfaces 106 may communicate machine-readable data, such as electronic, magnetic or optical signals embodied on a computer readable medium, or may translate the actions of users into activity that may be understood by computing device 100 (e.g., typing on a keyboard, speaking into the receiver of a cellular handset, touching an icon on a touch screen device, etc.) Interfaces 106 may further allow processor 102 and/or memory 104 to interact with other modules 108. For example, other modules 108 may comprise one or more components supporting more specialized functionality provided by computing device 100.

Computing device 100 may interact with other apparatuses via various networks as further shown in FIG. 1. For example, hub 110 may provide wired and/or wireless support to devices such as computer 114 and server 116. Hub 110 may be further coupled to router 112 that allows devices on the local area network (LAN) to interact with devices on a wide area network (WAN, such as Internet 120). In such a scenario, another router 130 may transmit information to, and receive information from, router 112 so that devices on each LAN may communicate. Further, all of the components depicted in this example configuration are not necessary for implementation of the present invention. For example, in the LAN serviced by router 130 no additional hub is needed since this functionality may be supported by the router.

Further, interaction with remote devices may be supported by various providers of short and long range wireless communication 140. These providers may use, for example, long range terrestrial-based cellular systems and satellite communication, and/or short-range wireless access points in order to provide a wireless connection to Internet 120. For example, personal digital assistant (PDA) 142 and cellular handset 144 may communicate with computing device 100 via an Internet connection provided by a provider of wireless communication 140. Similar functionality may be included in devices, such as laptop computer 146, in the form of hardware and/or software resources configured to allow short and/or long range wireless communication. Further, any or all of the disclosed apparatuses may engage in direct interaction, such as in the short-range wireless interaction shown between laptop 146 and wireless-enabled apparatus 148. Example wireless enabled apparatuses 148 may range from more complex standalone wireless-enabled devices to peripheral devices for supporting functionality in apparatuses like laptop 146.

Figure 2:
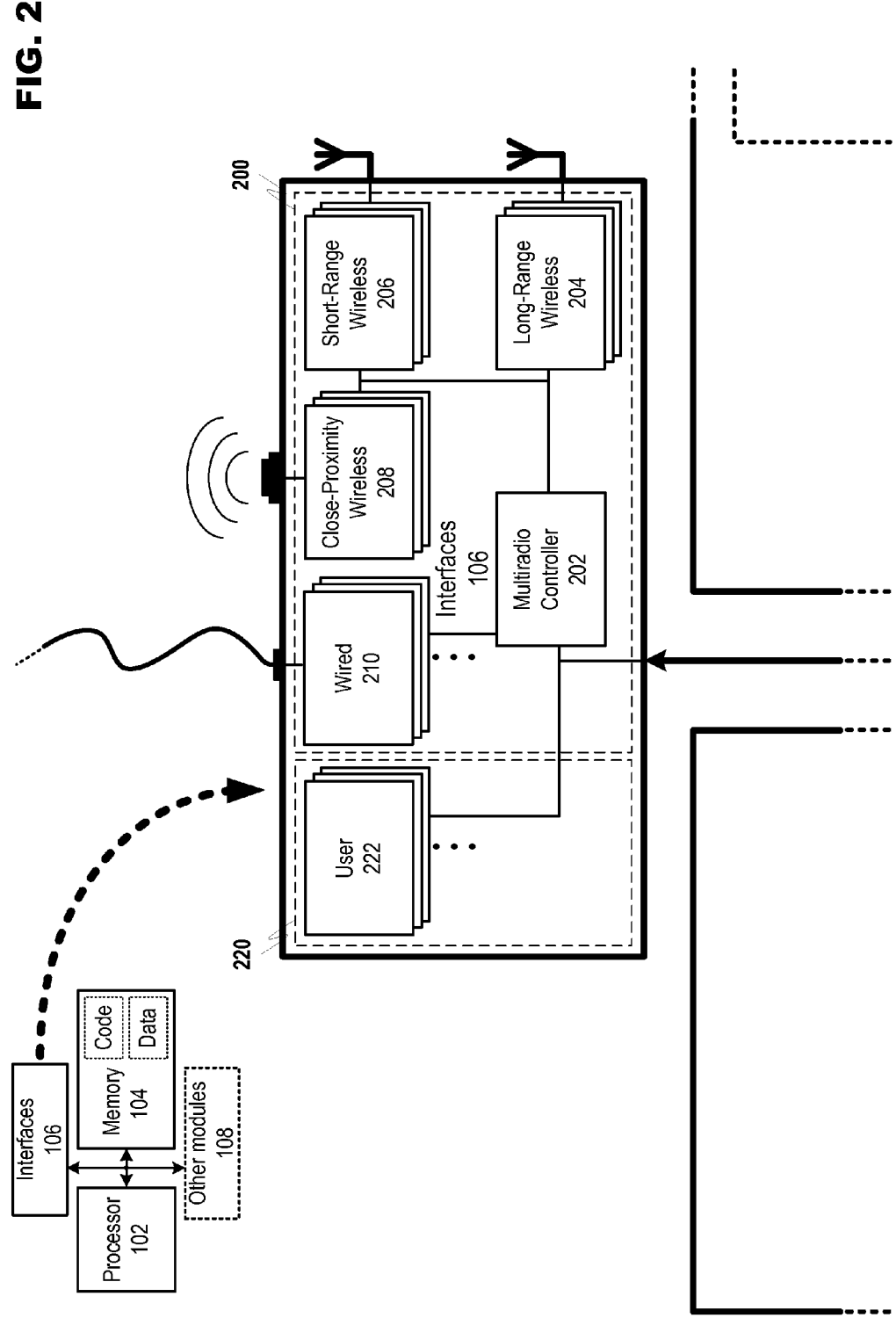
FIG. 2 discloses additional detail with respect to example communication interfaces usable with at least one embodiment of the present invention.

Further detail regarding example interface component 106, shown with respect to computing device 100 in FIG. 1, is now discussed with respect to FIG. 2. Initially, interfaces such as disclosed at 106 are not limited to use only with computing device 100, which is utilized herein only for the sake of explanation. As a result, interface features may be implemented in any of the apparatuses that are disclosed in FIG. 1 (e.g., 142, 144, etc.) As previously set forth, interfaces 106 may include interfaces both for communicating data to computing apparatus 100 (e.g., as identified at 200) and other types of interfaces 220 including, for example, user interface 222. A representative group of apparatus-level interfaces is disclosed at 200. For example, multiradio controller 202 may manage the interoperation of long range wireless interfaces 204 (e.g., cellular voice and data networks), short-range wireless interfaces 206 (e.g., Bluetooth and WLAN networks), close-proximity wireless interfaces 208 (e.g., for interactions where electronic, magnetic, electromagnetic and optical information scanners interpret machine-readable data), wired interfaces 210 (e.g., Ethernet), etc. The example interfaces shown in FIG. 2 have been presented only for the sake of explanation herein, and thus, are not intended to limit the various embodiments of the present invention to utilization of any particular interface. Embodiments of the present invention may also utilize interfaces that are not specifically identified in FIG. 2.

Multiradio controller 202 may manage the operation of some or all of interfaces 204-210. For example, multiradio controller 202 may prevent interfaces that could interfere with each other from operating at the same time by allocating specific time periods during which each interface is permitted to operate. Further, multiradio controller 202 may be able to process environmental information, such as sensed interference in the operational environment, to select an interface that will be more resilient to the interference. These multiradio control scenarios are not meant to encompass an exhaustive list of possible control functionality, but are merely given as examples of how multiradio controller 202 may interact with interfaces 204-210 in FIG. 2.

Figure 3:
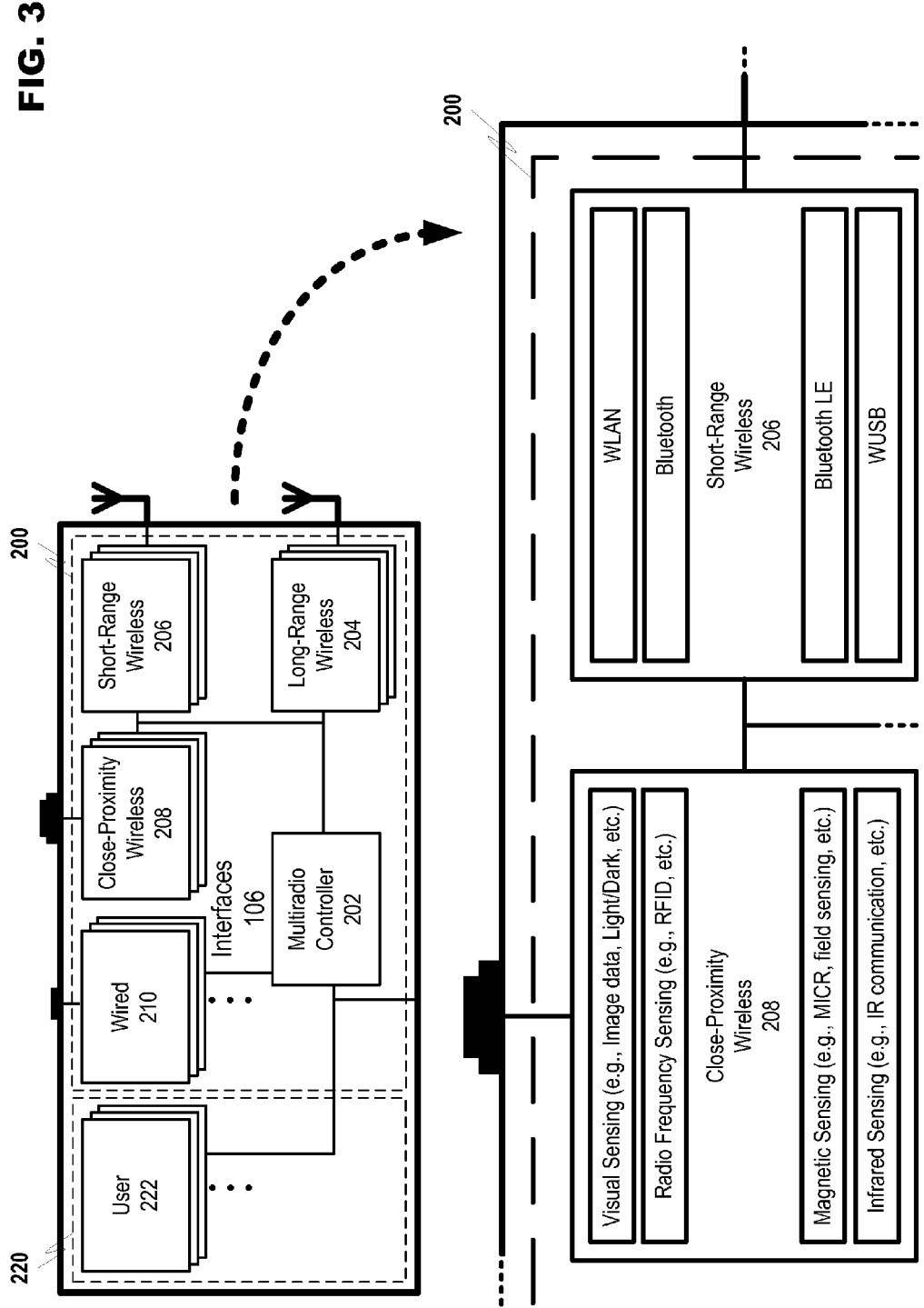
FIG. 3 discloses additional detail with respect to example close proximity and short range interfaces usable with at least one embodiment of the present invention.

The example communication interface configuration 106 disclosed in FIG. 2 may, in accordance with at least one embodiment of the present invention, further comprise example close-proximity wireless interfaces 208 such as set forth in FIG. 3. Resources for visual sensing may comprise at least a camera or similar sensor device capable of recording moving and/or still image data, light/dark data, color data, etc. Other examples of close-proximity sensing interfaces that may be incorporated in apparatuses may include, but are not limited to, transmission/reception interfaces for Near Field Communication (NFC), radio frequency (RF) transceivers for communicating data such as radio frequency identification (RFID) information, magnetic sensors for magnetic ink character recognition (MICR), magnetic field detection, etc., and infrared (IR) transmitters/receivers for communicating IR information over short distances.

Moreover, example short-range wireless interface 206 may comprise hardware and/or software resources for supporting various forms of short-range wireless communication. Examples of wireless communication that may be supported by interface 206 may include, but are not limited to, wireless local-area networking (WLAN), Bluetooth (BT) communication, Bluetooth Low Energy (BTLE) communication, wireless Universal Serial Bus (WUSB) communication, Ultra-wideband (UWB), etc. These forms of communication may, in various applications, support wireless interaction between two or more handheld wireless communication devices, between handheld wireless communication devices and stationary access points (AP), to peripheral interface devices, etc.

II. Example Operational Environment

Localization, or the process of determining user/apparatus location based on received electronic signals, is useful and valuable functionality that may be provided by mobile devices. The electronic information used in localization may be provided via various technologies including, but not limited to, satellite-based systems such as GPS in which apparatuses calculate location based on signals received from multiple satellites, cellular network-based systems and short-range wireless networks (e.g., Wi-Fi). In the case of cellular and short-range wireless networks, apparatuses may calculate location based on the locations of surrounding base stations which are used as reference points. While Wi-Fi may be used in the following disclosure in general reference to short-range wireless networking, the wireless protocols utilized in such systems is not strictly limited to wireless local area networking (WLAN) as defined under the IEEE 802.11 standard. On the contrary, it may be possible to employ other short-range wireless protocols, such as referenced above, in accordance with various embodiments of the present invention.

Figure 4:
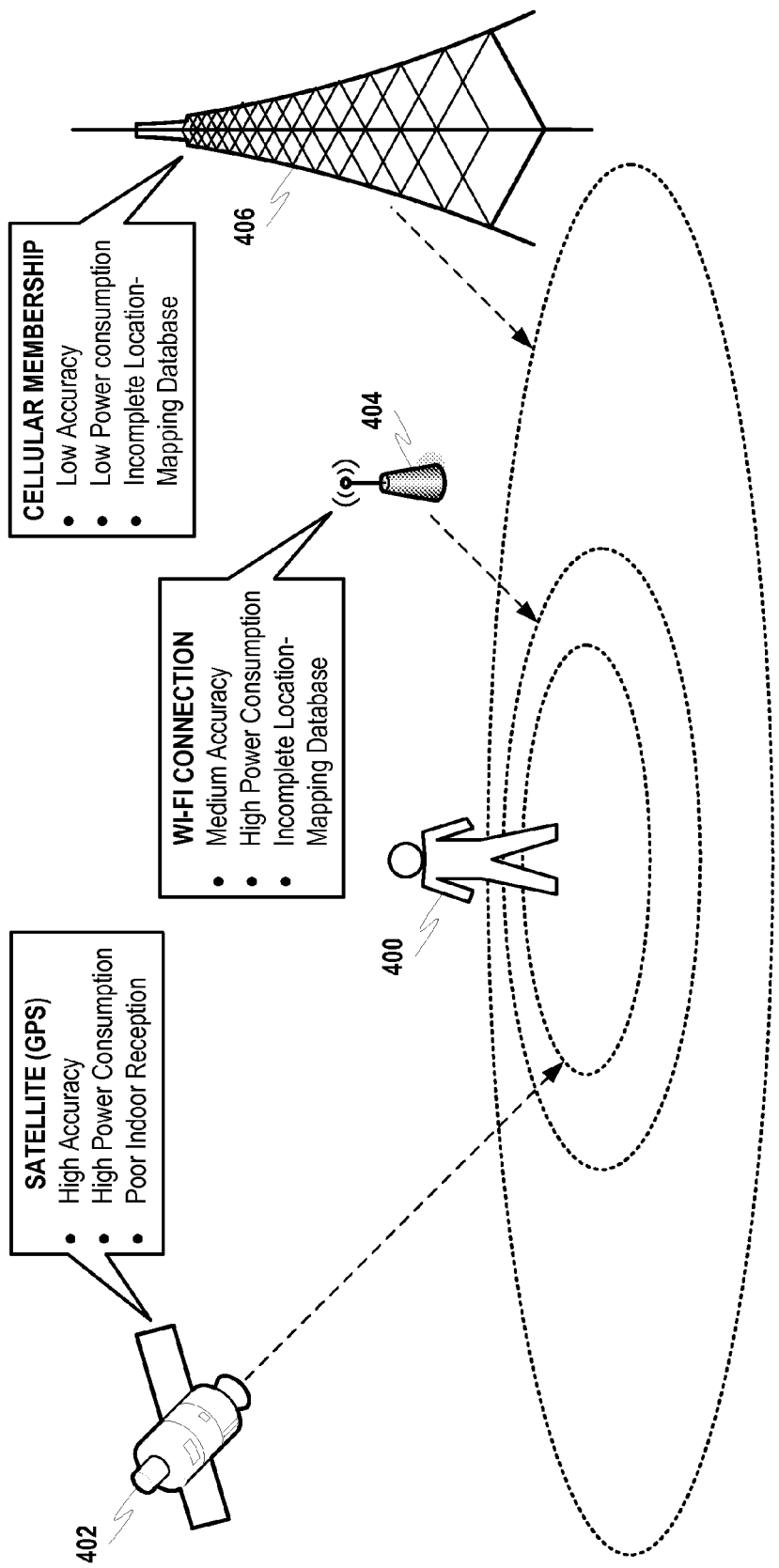
FIG. 4 discloses an example operational environment and positioning technologies in accordance with at least one embodiment of the present invention.

FIG. 4 discloses an example of user 400, who may be equipped with (e.g., carrying) an apparatus (such as disclosed above in FIG. 1 at 100). In order to determine the position of user 400, an apparatus may receive information via electronic wireless transmission and may resolve a relative or absolute position based on the received information. Localization via GPS 402, despite having expansive coverage and high accuracy, is known to have several drawbacks. GPS 402 is generally considered to have relatively high energy consumption, poor reception in certain areas (such as indoors and in urban settings), slowness in locking on satellite signals, etc. As a result, short-range wireless network-based solutions (e.g., Wi-Fi) 404 and cellular-based systems 406 have gained in popularity. Wi-Fi 404 and cellular 406 may overcome some of the drawbacks seen in GPS, but at the same time may include other weaknesses such as smaller coverage areas due to difficulty in constructing location maps of base stations, less accuracy due to the inherent limitations of short-range and long-range radios, errors due to the reliance upon constructed location maps, etc.

In practice, apparatuses may rely upon a combination of technologies to perform localization. Such multimodal methodologies attempt to leverage the benefits of each technology to overcome the weaknesses of the others by using them in an integrated manner. For example, Wi-Fi and cellular-based methods may initially provide quick, but rough, location estimates that may be later refined using GPS, if necessary. Existing multimodal systems generally provide a "one-size-fits-all" approach optimized based on the location itself, regardless of who uses it. For example, if two users were to execute the same localization methodology side-by-side they would trigger the same algorithmic flow and, excluding randomness, receive essentially identical results including the same geo-coordinates and accuracy, while incurring the same delay and energy costs.

However, such user-agnosticism may no longer be the right approach for localization. Legacy systems may have served well when location-based services were primarily instantaneous and memory-less applications that would "find where I am, show me some local information, and done" (and then start all over again). In simple scenarios specific location history and patterns for users did not matter, and objective and accurate measurement was more important. However, the requirements for positioning solutions are changing. Localization has increasingly become a continuous measure as part of the ever-evolving user context. Existing non-personalized positioning solutions fail to take into consideration the very diverse histories, patterns and interpretations of location among users, and as a result, may provide less-than-desirable results.

III. Examples of Personalized Localization

Users spend most of their time at a small number of places, or repeatedly en-route between these places. They may be labeled with names such as "Home," "Work," "Kid's School," etc. It may be extremely valuable to be able to identify these frequently visited places, and accordingly a user's location history/patterns, to facilitate a broad range of applications including context-aware User Interfaces (UI), smart commute services, targeted advertising, abnormal behavior detection, etc. These frequently visited places may vary greatly from person to person. For example, a user may go to several places that are very close to each other, yet may consider each of the places meaningful and distinct; while another user's places may be spread out. For example, a user's "Home" may be close (e.g., 100 m) or far (e.g., 100 km) from his/her "Work." Existing multimodal localization ignores such differences and always tries to provide the most-accurate result possible. However, given an example scenario wherein GPS, Wi-Fi and cellular-ID-based mechanisms are able to achieve approximate accuracy granularities of 20 m, 50 m and 1000 m, respectively, and likewise each typically consume energy at a rate of 400 mW, 400 mW and 10 mW, GPS and/or Wi-Fi would have to be employed to differentiate between place that are "close" (at a higher resource cost), while the cheaper cellular-ID mechanism alone may be sufficient to provide localization between places that are "far" apart. Utilizing a 20 m-50 m resolution in the latter case may be considered a waste of energy where non-personalized localization is not employed. Batteries in mobile apparatuses drain quickly without personalized localization, wasting energy by obtaining highly accurate results that are unnecessary. Personalization allows apparatuses to disable high consumption resources (e.g., GPS/Wi-Fi) in favor of low cost resources (e.g., cellular IDs) when lower-accuracy mechanisms may be adequate for localization (e.g. when differentiating between two routes that are kilometers apart).

In accordance with at least one embodiment of the present invention, a multimodal localization solution may be implemented that considers the specific location history and patterns for a user when performing positioning. Such systems may balance the dual goals of accuracy and energy consumption while still delivering acceptable performance. In at least one example implementation, the system may be situated totally in a single apparatus (e.g., a mobile user device), allowing all information collection and processing to occur within the same device. However, configurations are also possible wherein user apparatuses may interact with remotely-located resources, such as other apparatuses (e.g., other wireless devices, databases, servers, etc.) that are in communication with the user apparatuses. In the latter case, user apparatuses may rely upon the remotely-located resources for some or all of the information processing that may occur to information that is initially collected by the user apparatuses. The other apparatuses may then provide results from their processing back to the user apparatuses for use in providing the ultimate deliverable to the user (e.g., configuring localization).

Initially, the system may begin by collecting location data. Apparatuses know nothing about the mobile user when the system is first activated, and must collect location data for training As part of this training, the system may monitor user location changes and collect various trace data such as GPS readings, scanned Wi-Fi base stations and surrounding cellular IDs. In some embodiments data collection may be expedited or enhanced through interaction with remote resources. For example, if a server knows the locations of certain Wi-Fi and/or cellular towers, this information may be provided to complement the knowledge of user apparatuses. Embodiments of the system may then proceed to identify significant places or routes. When enough trace data has been collected, pattern recognition may be applied to identify significant places and routes based on recorded user information. Significance may bear different meanings in different implementations, to which various embodiments of the present invention may be agnostic.

After significant places or routes have been established, classification criteria corresponding to each place or route may be established. Establishing classification criteria may comprise, in accordance with at least one embodiment of the present invention, the application of data mining and machine learning techniques to find the best criteria to classify each significant place and route, given certain constraints of accuracy, energy consumption, etc. These criteria may be optimized for, and may be specific to, a particular user location history and patterns, and may not be applicable to other users even if they share common places or routes. For example, even if users visit the same locations, their pattern of travel, duration of visit, etc. may be dissimilar, which may result in totally different classification criteria. If possible, the apparatus may then apply existing criteria in future classification. Future place or route classification may be based on existing criteria, unless all existing criteria fail to produce credible results. This may occur in situations where user patterns have changed, where the apparatus may be entering uncharted territory, etc. In such instances the significance determination and classification steps may be revisited until existing or new criteria becomes applicable. Existing and newly generated criteria may also be merged and reconciled, if necessary.

In accordance with at least one embodiment of the present invention, readings from GPS, Wi-Fi and the cellular radio may be periodically sampled and saved to the local file system of an apparatus (e.g., a mobile device). An example of information that may be obtained in an apparatus is disclosed in FIG. 5 in table 500. Readings from GPS may comprise geo-coordinate tuples consisting of the latitude, longitude, altitude, horizontal accuracy, vertical accuracy, satellite information, etc., or a subset of these measurements. Readings from Wi-Fi map comprise Media Access Control (MAC) addresses and names of Wi-Fi base stations, and possibly other devices that are operating in an ad hoc mode. Readings from cellular systems may include a cellular ID comprising four parts: mobile country code (mcc), mobile network code (mnc), location area code (lac) and cellular id (cid), and signal strength from the connected cell. In some instances cellular operating systems may also provide information about other surrounding cells in a so-called "field test" mode. Table 500 shows an illustrative example of recorded trace data in the form of a table. Each row corresponds to data samples that consist of readings from GPS, Wi-Fi and cellular radio. The sampling frequency is once every 10 seconds.

IV. Examples of Identifying and Classifying Significant Places/Routes

Various methodologies may be employed in defining and identifying significant places and routes based on collected location trace data. In accordance with at least one embodiment of the present invention, the actual implementation of the system may be agnostic as to how significant places/routes are defined and identified. Methods for identifying significant places may be based on, for example, how long a user stays at a place, when he/she visits a place, how frequently he/she visits a place, etc. Identification methodologies may be fully automated, or in some cases may require human interaction. For example, we may define a significant place to be a circular area having a radius of up to 500 m in which the user has spent at least 30 minutes continuously for a single primary purpose. It may also be possible for users to manually indicated or tag significant places. After at least two significant places are identified, transitions between two significant places may be identified as a significant route.

Figure 6:
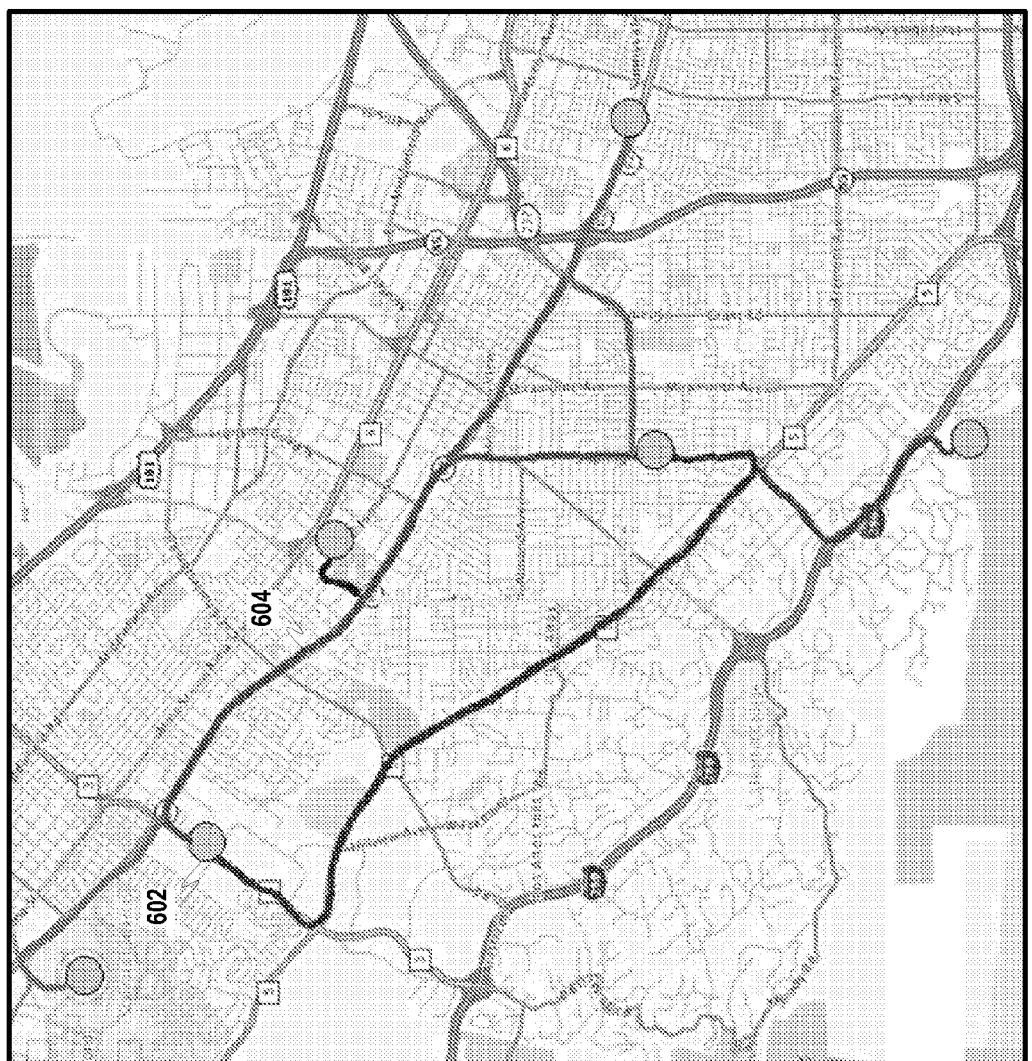
FIG. 6 discloses example significant place or route classification in accordance with at least one embodiment of the present invention.

FIG. 6 shows an example of significant places and routes identified from a user's trace data represented on map 600. Circles 602 represent significant places while emphasized (colored or darkened) lines 604 represent significant routes between places. After significant places and routes are identified, another column may be added to the location trace data so that it becomes a classification training set. See table 700 in FIG. 7 for an example. The last column in FIG. 7 is a classification label, which may be blank if, for example, the sample does not correspond to any significant place or route. FIG. 7 discloses human-friendly labels such as "Home," "Work," and "Home –> Work, Route #1," but system-generated labels such as P1, P2 and P1:P2:R1 may work equally well for classifiers. Various classification algorithms may be employed to the training set to produce a classifier, such as the Decision Tree, Support Vector Machine or K-Nearest Neighbor. In addition to accuracy, energy consumption and/or other costs may also be considered to evaluate the classifier. For example, for a given classifier "C" the classification criteria "F(C)" may be a function of both accuracy and energy consumption:

$$F(C)=F(A(C), E(C)) \quad (1)$$

where A(C) is the required accuracy associated with C and E(C) is the expected energy consumption for C. A(C) may be determined based on classification results, while E(C) may be calculated based on classification algorithms involving the power usage of one or more of GPS, Wi-Fi and cellular IDs. For example, the energy cost of GPS is generally comparable to the cost of Wi-Fi scanning, and both of these localization technologies have a substantially greater expected energy burden when compared to just utilizing cellular IDs for positioning. The classifier that is selected is the one that has the highest F(C) score (e.g., C=argmax$_C$ F(C)). How to select the score function F(C) may vary based on implementation. For example, in accordance with at least one embodiment of the present invention the function F(C) may be defined simply as picking the least costly classifier that meets the minimum accuracy requirement:

$$F(C)=-\text{infinity, if } A(C)<\text{required minimum accuracy threshold} \quad (2)$$

$$F(C)=-E(C), \text{ otherwise} \quad (3)$$

Generated criteria may be immediately applied to future classification. Since the classifier is tuned towards a user's specific location history and patterns, it may be intelligent enough to pick the best localization strategy for that particular user. In an real-world example of personalization, "Alice" may live in Menlo Park, Calif. and work in San Francisco. Alice may also shop in Mountain View and frequent a church in San Jose. All these places are at least 5 km away from each other. The best localization strategy therefore may be to use only cellular IDs, which are capable and economical. In a different example, "Bob" may lives next door to Alice. However, Bob may work at a restaurant down a few street blocks. Bob may also shop in Mountain View but may go to a local church in Menlo Park. The places corresponding to Home, Work and Church for Bob are all too close to be adequately differentiated using cellular IDs, but Wi-Fi and/or GPS may provide acceptable resolution in these situations. Cellular ID works still may be suitable for other places frequented by Bob, such as the places where he goes shopping, etc. User apparatuses may also upload classification criteria to a server for aggregation across multiple users. While a goal of the localization solution, as set forth herein, may be to provide a personalized approach, such a goal does not completely rule out cross-user validation. For some popular places/routes, other users' classification criteria could be used for first screening.

When users begin to gradually change their location patterns, or visit new places, existing classification criteria may be deemed unsuitable. As a result, it may be time to update criteria by re-launching significant place or route determination, followed by significant place or route classification. In accordance with at least one embodiment of the present invention, there are multiple ways to merge new criteria with old criteria. For example, if a new criterion is disjoint with any old ones, it may simply be added to the criteria database. If a new criterion overlaps with some existing criteria, but there are no conflicts, the new and old criteria may be merged together. If a new criterion conflicts with at least one existing criterion, overwrite the old with the new. Existing criteria that have not been applied for a long time may be purged. Such criteria may have been created due to errors, a one-time visit to a place (e.g., a vacation) or the user has simply abandoned the previous identified as significant places/routes.

V. Example State Transition Detection in View of Second Level Classifiers

As discussed above, choosing a technology for implementing localization mechanisms often includes weighing a tradeoff between accuracy and energy efficiency, since technologies achieving higher accuracy almost inevitably cost more energy. As set forth above, the introduction of "personalization" into localization systems may help save energy while retaining high overall accuracy in recognizing one's significant places and routes. A multi-modal configuration strategy may be selected for each place and route that utilizes more conservative localization technologies (e.g., cellular IDs) whenever possible and more expensive ones (e.g., GPS and Wi-Fi readings) only when required.

Localization systems such as the above may be effective at recognizing a significant place or route when the apparatus is in "steady state" (e.g., not in state transition, such as operating within the boundaries of a significant place or route, mid-route between significant places, etc.), but may be slow at detecting state transitions, such as when a user departs a place to begin a trip, is ending a trip at a desired destination, etc. Using coarse resolution granularity (e.g., 100-1000 m resolution provided by cellular-ID-based localization) may extend the time it takes for state transitions to stabilize, wherein apparatuses realize that they have reached a new state. Such problems may exist in localization solutions that are based upon place or route personalization, which only take current apparatus state (e.g., current cellular ID) into consideration when classifying a place or route. In other words, these solutions do not take into account what apparatuses saw moments ago. Adding near-term observation history may be valuable in speeding up transition detection before it reaches steady state.

Figure 8:
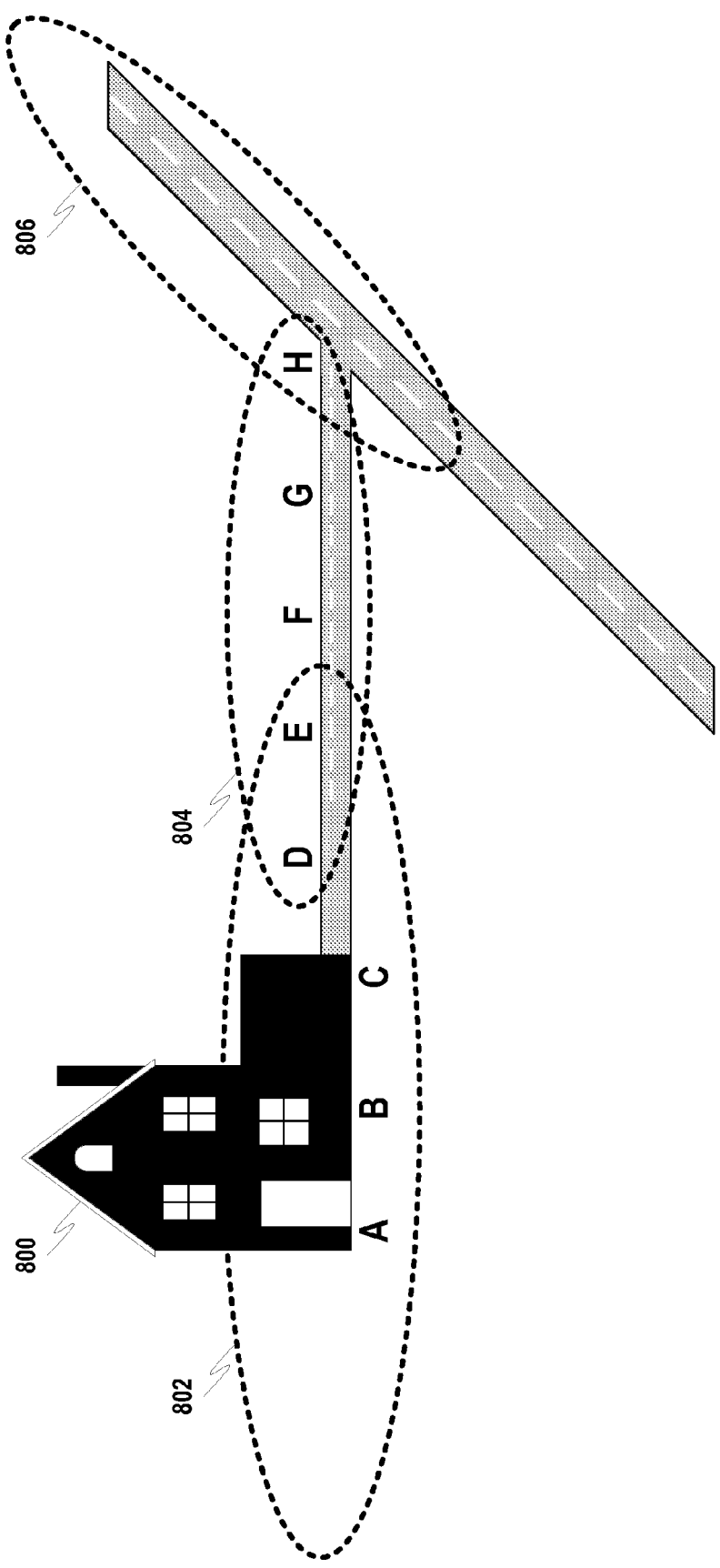
FIG. 8 discloses examples of state transitions in accordance with at least one embodiment of the present invention.

FIG. 8 illustrates this problem with an example scenario. Five cellular IDs A-E may be observed at place 802 corresponding to house 800, while "D" and "E" may also be observed at the beginning of route 804. Cellular IDs F-H may be observed when driving on either routes 804 or 806. When an apparatus observes cellular IDs "D" or "E" alone, it may be difficult for the device to discern whether the user is staying at the place or leaving for a trip. Similarly, when an apparatus detects cellular ID "H" alone, it may be impossible for the apparatus to determine whether travel is occurring on route 804 or 806 without having some sort of context regarding the state existing prior to detection.

Some localization solutions propose to scan for nearby Wi-Fi base stations in order to assemble beacon vectors as signatures for resolving location. However, these systems reintroduce reliance upon secondary Wi-Fi scanning, which increases apparatus energy consumption. Accelerometers may be utilized to detect whether apparatuses, and hence users, are in motion, and may deactivate GPS or other more-expensive localization technologies if no motion is detected. While this is a popular approach, problems may exist in scenarios where users/devices are in motion but still considered to be in the same logical place (e.g., walking up/downstairs in an office building, working out in a fitness center, etc.). A cellular-ID-based approach does not suffer from either of these problems.

In accordance with at least one embodiment of the present invention, a solution to state transition detection may be based on a general observation that even though multiple places and/or routes may overlap with each other in terms of location-indicating traits such as cellular IDs, such as in the place and route example in FIG. 8, they may still exhibit different internal transition patterns, and thus, may be differentiable if we look at near-term observation history. In terms of FIG. 8, "D" or "E" may show up both at place 802 and on route 804, but the occurrence at place 802 may be brief and interleaved with longer observations of another more dominant cellular ID such as "A," while on route 804 they usually appear briefly in pairs with "D" preceding "E," etc.

In short, example implementations of the invention may utilize near-term observation history of apparatus location-indicating traits (e.g., cellular IDs) for fast and energy-efficient detection of whether an apparatus (and a user of the apparatus) remains at a place, is leaving a place for a trip, is en route, is arriving at a destination, etc. For example, example embodiments of the present invention may comprise four steps that may be executed in a user apparatus, by another apparatus (e.g., a remote resource like a server) in communication with the user apparatus, or by a combination of the two. The first step may include building a first level classifier responsible for recognizing significant places and routes when the apparatus is in steady state. It may utilize any appropriate localization method, but preferably a multi-modal approach based on personalization such as presented above. Next, a set of second level, n-gram type of classifiers may be formulated for each place and route. Second level classifiers may be built on top of a low cost localization methodology (e.g. cellular-ID-based). The building of second level classifiers may be performed in the apparatus that sensed location and/or built the first level classifiers such as a user apparatus, or may be performed remotely, for example, by a server that is in wired or wireless communication with the user apparatus.

The first level classifier may be used to recognize when apparatuses are in a stable condition at a place or on a route. A corresponding second level classifier may then be used to monitor state transitions, such as if the apparatus is transitioning from a place to a route, leaving a place (e.g., in cases where a user is at the place), or arriving at a place (e.g., in cases where a user is on a route). If it is determined, in view of the second level classifier, that a state transition has been observed, the first level classifier may then be used to confirm the result. Confirmation of state transition, or lack thereof, from a first level classifier may be used to reinforce the knowledge of second level classifier(s) in future operation.

In accordance with at least one embodiment of the present invention, first level classifiers that identify significant place and routes may be generated in accordance with a localization system such as previously disclosed herein with respect to FIG. 1-7 taken in conjunction with the corresponding sections of the disclosure. For example, FIG. 4 discloses an example data set from which the first level classifier may be "trained" using any appropriate machine learning and data mining algorithms. For the sake of explanation herein it is also assumed that the training data set may be organized as a time series. This activity may be performed all within the user apparatus or in combination with a remote device such as other wireless user devices, a networked server device, etc.

A set of second, n-gram type of classifiers, one for each place and route may then be generated. Feature(s) of interest may be extracted from the training data set and may be organized as a time series. In accordance with at least one embodiment of the present invention, cellular IDs may be utilized for generating the second level classifiers. An example set of time series information may comprise the following information:

(1234567890, (310, 410, 567, 123), "Home"), (1234567900, (310, 410, 567, 123), "Home"), (1234567910, (310, 410, 567, 123), "Home ->Work, Route #1")

In accordance with at least one embodiment of the present invention, the elements in a time series that contain the same values (e.g., have the same cellular ID and place/route labels) may then be merged, and timestamps may be replaced with another descriptive parameter such as duration. In terms of the previous example, the first two elements in the time series above will be merged and replaced with a single element: (20, (310, 410, 567, 123), "Home") resulting in a modified time series. In the modified series "20" indicates that the user stayed home for twenty seconds under that cellular ID before leaving home. N-grams from the modified time series may then be computed. N-grams are a concept widely used in natural language processing. Its n-elements are consecutive from a series. For example, given a letter series "abcde", its bigrams (2-grams) are "ab", "bc", "cd" and "de", its trigrams (3-grams) are "abc", "bcd" and "cde", its 4-grams are "abcd" and "bcde", etc. The n-value may be kept low to balance between dependency and complexity. For the sake of explanation herein it will be assumed that n=3, but in accordance with various implementations it is also possible for other n-values to be used.

In one accordance with at least one embodiment of the present invention, the first n-1 elements of an n-gram may be restricted to have the same place/route label:

((210, (310, 410, 567, 123), "Home"), (960, (310, 410, 567, 456), "Home"), (10, (310, 410, 567, 789), "Route #1"))

In an alternative implementation the durations may be quantized. For example, we may use "long", "medium" and "short" instead of numbers. An example is:

(("medium", (310, 410, 567, 123), "Home"), ("long", (310, 410, 567, 456), "Home"), ("short", (310, 410, 567, 789), "Route #1"))

In a further alternative implementation the duration field may be dropped from the n-gram. An example is:

(((310, 410, 567, 123), "Home"), ((310, 410, 567, 456), "Home"), ((310, 410, 567, 789), "Route #1"))

Second level classifiers may be built in a user device, with assistance from other user devices (e.g., in a communal processing or cloud computing architecture), by servers in communication with the user device, etc., after n-grams have been formulated, for example, one corresponding to each significant place and route. For example, when we build second level classifiers for the significant place "Home" only n-grams wherein the first n-1 elements include the label "Home" may be considered. The probability for each place or route label L may then be computed such as in the following example:

Prob (n-th element in n-gram has label L|first n-1 elements in n-gram have label "Home", and cellular ID in n-th element is cid)

To simplify, the probability above to P(L\X) may be rewritten where X is the observation n-gram (e.g., with the label of the n-th element still undetermined) and Y is the label to classify. The second level classifier may then operate as follows:

$L = \text{argmax}_L P(L|X) = \text{argmax}_L (P(X|L) \cdot P(L))$

P(L) is the prior probability that may be computed from the training set. For example, if an apparatus (and user) has spent 40 hours at home in a 72-hour period, then the prior probability of "Home" would be 40/72=5/9. P(X\L) is the likelihood of label L given the observation of n-gram X. It may be computed by selecting all n-grams that match X and counting how many of those have an n-th element that has label L. The classifier will pick the place or route label that has the maximum posterior probability in view of the observation n-gram.

In accordance with at least one embodiment of the present invention, state transition monitoring may then be executed by running a second level classifier to observe state transitions after the first level classifier has reached steady state. When an apparatus (and user) has been at a significant place, or on a significant route, for a duration, the state becomes stable such that it may be easy for a first level classifier to recognize. The first level classifier may then be put to sleep, and a second level classifier may initiate to monitor state transitions with little additional energy cost. Every time a new observation (e.g., in the example disclosed above it may be a different cellular ID) becomes available, the second level classifier may update its observation n-gram X and compute the most probable label associated with the new observation. If the new label is different from the previous one, the first level classifier may be reactivated and the second level classifier may be put in a sleep state. Otherwise the monitoring process may continue.

In at least one alternative implementation, a threshold θ may be introduced to force the first level classifier to wake up and make classification if a second level classifier fails to produce convincing results. For example, the second level classifier may be altered as follows:

IF argmaxL P(L|X)<θ, THEN apply first level classifier

In accordance with at least one embodiment of the present invention, first level classifiers may be rerun to confirm state transition. A first level classifier, awoken from a sleep state, may classify current user/apparatus position. If the user/apparatus are determined to be at a different place or on a different route from what has been previously detected, the first level classifier may confirm the observation of the second level classifier. Otherwise, the triggering of the second level classifier may be considered an error. Right or wrong, this result may be fed back to the second level classifier to reinforce its knowledge (e.g., by re-computing the probabilities for the second level classifiers). Errors from the second level classifiers may waste some energy due to a first level classifier being reactivated unnecessarily. In instances of false negatives (e.g., where a state changed but a second level classifier did not catch it), users may notice a delay and unresponsiveness on his/her device, however, sensitivity may be tuned through the use of a threshold θ, such as set forth in the above alternative configuration.

Figure 9:
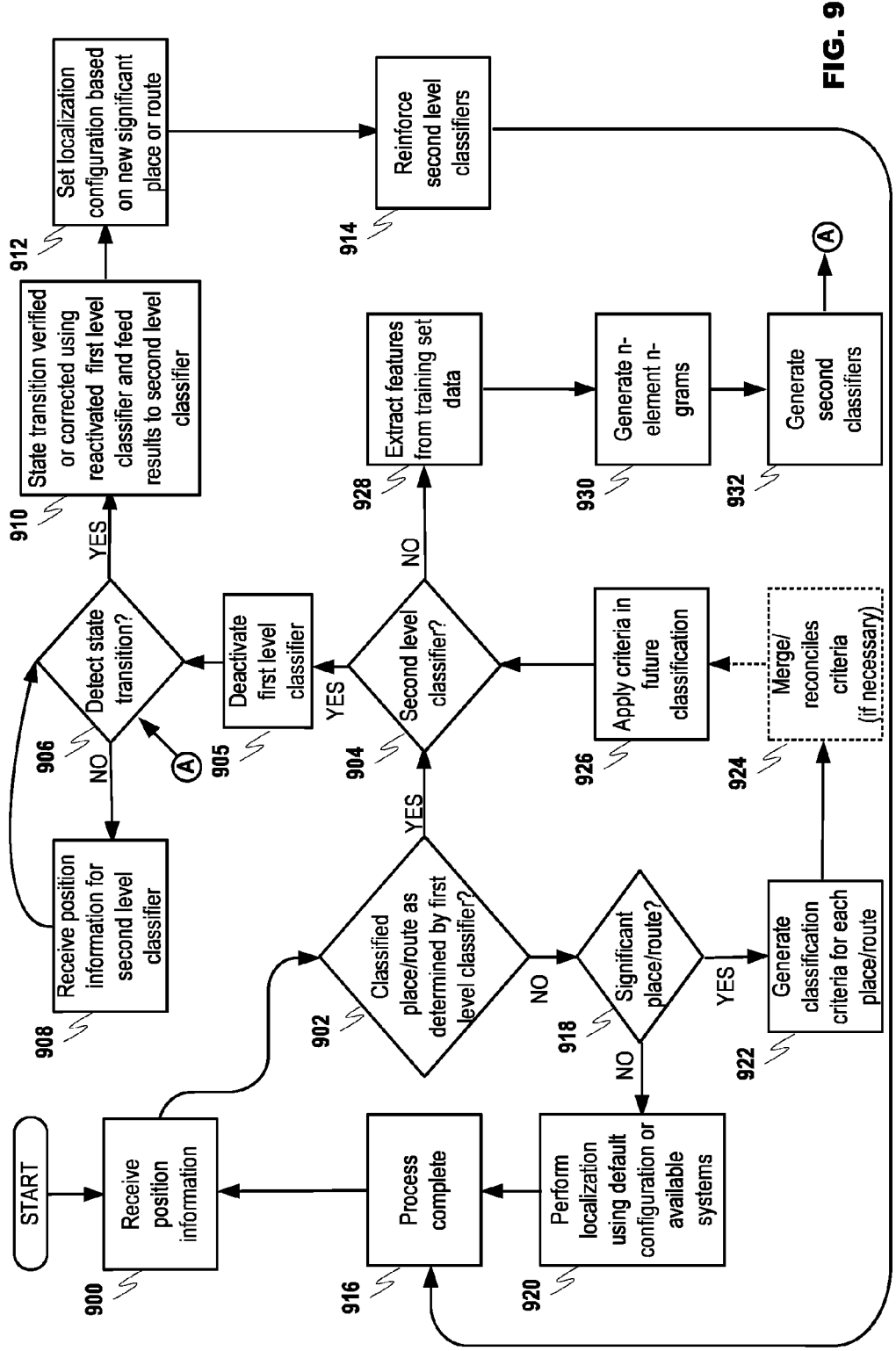
FIG. 9 discloses a flowchart for example classification and state transition detection processes in accordance with at least one embodiment of the present invention.

A flowchart for an example state change detection process, in accordance with at least one embodiment of the present invention, is now disclosed in FIG. 9. It is important to note that the following example process steps may be performed all within a user apparatus, by other apparatuses (e.g., other user apparatuses, a server, etc.) that are in communication with the user apparatus, or by a combination of the two. The process may initiate in step 900 where an apparatus (e.g., one of the example apparatuses described above with respect to FIG. 1-3) may receive position-indicating information. Position-indicating information may be received via various localization technologies, including at least the example technologies previously described herein including GPS, Wi-Fi connection and cellular IDs. A determination may then be made by a first level classifier in step 902 as to whether a significant place or route may be recognized, based on the received position-indicating information, using previously generated criteria. In order to reduce energy consumption, localization technologies having higher energy consumption, such as GPS and Wi-Fi connection, may be involved only when technologies having lower energy consumption, such as cellular membership, are unable to recognize the significant place or route alone.

If in step 902 the current position of the apparatus is determined to correspond to a significant place or route, then in step 904 a further determination may be made as to whether a second level classifier exists corresponding to the significant place or route identified by the position information. If a second level classifier corresponding to the current significant place or route is determined to exist in step 904 first level classifier may be deactivated in step 905, and then in step 906 sensing for state transition may initiate. During state transition detection, updated position information may continue to be received in the apparatus in step 908 until a state transition is detected in step 906. The process may then proceed to step 910 wherein a first level classifier may be reapplied (e.g., reactivated from a sleep state) in order to verify that the current position information for the apparatus actually applies to a different significant place or route than previously identified in step 902. In accordance with at least one embodiment of the present invention, if the state transition detected in step 906 is determined to be a false positive in view of the first level classifier in step 910 (e.g., the first level classifier discovers that the significant place or route has not changed), then results from the first level classifier may be used to correct the second level classifier. In step 912 a localization configuration for the current significant place or route may then be applied in the apparatus. Information obtained during the process may then be utilized in reinforcing the second level classifiers in step 914 in order to, for example, further refine the ability of second level classifiers to detect state transitions. The process may then be complete in step 916 and may return to step 900 in preparation for the next reception of position information in the apparatus.

If in step 902 it is determined that the current location of the apparatus does not correspond to a previously classified significant place or route, then in step 918 a further determination may be made as to whether the current location of the apparatus should be deemed as a significant place or route. This classification may be based on, for example, information collected over time in the apparatus. This accumulated information may be examined, for example, using data-mining and machine learning techniques in order to identify places or routes that are frequently visited or utilized by a user. This determination may be based on various factors pertaining to both the user and the location. With respect to the user, the criteria may analyze how often the user visits the location, the total duration of the user's visit to the location, the number of different stops the user makes within the boundary of the location and the distance between each of these stops, etc. With respect to the location, the criteria may analyze what localization technologies are available in the location, the reliability (e.g., signal strength, interference, etc.) of the signals associated with each of the localization technologies, the types of routes (e.g., local/highway) within the location, etc. If in step 918 the current place or route is deemed to have no significance, then in step 920 the apparatus may operate in a default configuration or utilizing whatever localization technology is available. The process may then be complete in step 916 and may return to step 900 in preparation for the next reception of position information in the apparatus.

On the other hand, if in step 918 a determination is made that the current location of the apparatus may be deemed a significant place or route, the process may move to step 922 where new classification criteria may be generated for the place or route. The classification criteria may be generated, for example, using the previously disclosed functions related to position resolution and energy consumption. As an optional step, existing classification criteria and new classification criteria may then be merged or reconciled in required in step 924. Merging and/or reconciling may comprise evaluating the new and existing classification criteria to look for similarities or differences, and then replacing duplicate, unused or expired classification criteria. The process may then proceed to step 926 where the new classification criteria may be applied to the current place or route, and may continue on to step 904 where the determination is again made as to whether a second level classifier corresponding to the current significant place or route already exists. An example process flow where a second level classifier corresponding to the current significant place or route is determined to exist has been described above.

However, if in step 904 a determination is made that a second level classifier does not already exist for the current significant place or route, then in step 928 features may be extracted from a training set data for use in creation of a second level classifier. For example, training set data based on observed cellular IDs accumulated over time may have already been retained for performing a first level classification, and this information may be further analyzed in view of other measurable characteristics (e.g., duration of time spent in a significant place or route, number of visits made to significant places or routes, etc.). The extracted information may then be analyzed in step 930 in order to generate n-element n-grams by, for example, utilizing the example computational methods previously disclosed herein. The process may then proceed to step 932 wherein the n-element n-grams are utilized as a basis for generating second level classifiers. After second level classifiers are generated, the process may return to step 906 (as represented in FIG. 9 by the on-page transitional reference "A") wherein state transition detection may initiate, and the process may proceed as previously described.

While various example configurations of the present invention have been disclosed above, the present invention is not strictly limited to the previous embodiments.

For example, the present invention may include, in accordance with at least one example embodiment, an apparatus comprising means for receiving position information in an apparatus, means for determining if the position information is in a classified place or route, means for, if the position information is determined to be in a classified place or route, determining if a second level classifier exists for the classified place or route, the second level classifier identifying a state transition between classified places or routes, and means for, if a state transition between classified places or routes is detected based on the second level classifier, applying a new localization configuration in the apparatus.

At least one other example embodiment of the present invention may include electronic signals that cause apparatuses to receive position information in an apparatus, determine if the position information is in a classified place or route, if the position information is determined to be in a classified place or route, determine if a second level classifier exists for the classified place or route, the second level classifier identifying a state transition between classified places or routes, and if a state transition between classified places or routes is detected based on the second level classifier, apply a new localization configuration in the apparatus.

Accordingly, it will be apparent to persons skilled in the relevant art that various changes in forma and detail can be made therein without departing from the spirit and scope of the invention. The breadth and scope of the present invention should not be limited by any of the above-described example embodiments, but should be defined only in accordance with the following claims and their equivalents.

What is claimed:

1. A method, comprising:
receiving position information in an apparatus;
determining if the position information is in a classified place or route;
if the position information is determined to be in a classified place or route, determining if a second level classifier exists for the classified place or route, the second level classifier identifying a state transition between classified places or routes, wherein a classified route comprises a path, for travel by a person, that connects two different classified places; and
if a state transition between classified places or routes is detected based on the second level classifier, applying a new localization configuration in the apparatus,
wherein both classified places and classified routes have second level identifiers associated therewith.

2. The method of claim 1, wherein one or more of the determining steps are performed by another apparatus in communication with the apparatus.

3. The method of claim 1, wherein classified places or routes are places or routes that were previously identified as significant.

4. The method of claim 3, wherein if the position information is not in a classified place or route, determining whether the position information should be classified as a significant place or route.

5. The method of claim 1, wherein if it is determined that a second level classifier does not exist for the classified place or route, generating at least one second level classifier based on classified places or routes.

6. The method of claim 5, wherein generating the at least one second level classifier comprises generating n-grams based on a time series of classified places or routes; and generating at least one second level classifier based on the n-grams, wherein each of the n-grams comprises n-elements and n is a positive integer.

7. The method of claim 1, wherein determining if the position information is in a classified place or route is a determination made based on an active first level classifier, the method further comprising deactivating the first level classifier; verifying a detected state transition by reactivating the first level classifier in order to determine if the position information indicates that the apparatus is now in a different classified place or route; and feeding back results from the verification to the second level classifier.

8. The method of claim 7, further comprising applying the new localization configuration in the apparatus based on the different classified place or route.

9. A computer program product comprising a non-transitory computer readable storage medium having computer executable program code recorded thereon, the computer executable program code comprising:

code configured to cause an apparatus to receive position information;

code configured to cause the apparatus to determine if the position information is in a classified place or route;

code configured to cause the apparatus to, if the position information is determined to be in a classified place or route, determine if a second level classifier exists for the classified place or route, the second level classifier identifying a state transition between classified places or routes, wherein a classified route comprises a path, for travel by a person, that connects two different classified places; and code configured to cause the apparatus to, if a state transition between classified places or routes is detected based on the second level classifier, apply a new localization configuration in the apparatus, wherein both classified places and classified routes have second level identifiers associated therewith.

10. The computer program product of claim 9, wherein one or more of the determining steps are performed by another apparatus in communication with the apparatus.

11. The computer program product of claim 9, wherein classified places or routes are places or routes that were previously identified as significant.

12. The computer program product of claim 11, further comprising code configured to cause the apparatus to, if the position information is not in a classified place or route, determine whether the position information should be classified as a significant place or route.

13. The computer program product of claim 9, further comprising code configured to cause the apparatus to, if it is determined that a second level classifier does not exist for the classified place or route, generate at least one second level classifier based on classified places or routes.

14. The computer program product of claim 13, wherein the code configured to cause the apparatus to generate the at least one second level classifier further comprises code configured to cause the apparatus to generate n-grams based on a time series of classified places or routes; and code configured to cause the apparatus to generate at least one second level classifier based on the n-grams, wherein each of the n-grams comprises n-elements and n is a positive integer.

15. The computer program product of claim 9, wherein to determine if the position information is in a classified place or route is a determination made based on an active first level classifier, the computer program product further comprising code configured to cause the apparatus to deactivate the first level classifier; code configured to cause the apparatus to verify a detected state transition by reactivating the first level classifier in order to determine if the position information indicates that the apparatus is now in a different classified place or route; and code configured to feed results from the verification back to the second level classifier.

16. The computer program product of claim 15, further comprising code configured to cause the apparatus to apply the new localization configuration in the apparatus based on the different classified place or route.

17. An apparatus, comprising:
at least one processor; and
at least one memory including executable instructions, the at least one memory and the executable instructions being configured to, in cooperation with the at least one processor, cause the apparatus to perform at least the following:

receive position information;

determine if the position information is in a classified place or route;

if the position information is determined to be in a classified place or route, determine if a second level classifier exists for the classified place or route, the second level classifier identifying a state transition between classified places or routes, wherein a classified route comprises a path, for travel by a person, that connects two different classified places; and if a state transition between classified places or routes is detected based on the second level classifier, apply a new localization configuration in the apparatus, wherein both classified places and classified routes have second level identifiers associated therewith.

18. The apparatus of claim 17, wherein one or more of the determining steps are performed by another apparatus in communication with the apparatus.

19. The apparatus of claim 17, wherein classified places or routes are places or routes that were previously identified as significant.

20. The apparatus of claim 19, wherein if the position information is not in a classified place or route, the at least one memory and the executable instructions being further configured to, in cooperation with the at least one processor, cause the apparatus to determine whether the position information should be classified as a significant place or route.

21. The apparatus of claim 17, wherein if it is determined that a second level classifier does not exist for the classified place or route, the at least one memory and the executable instructions being further configured to, in cooperation with the at least one processor, cause the apparatus to generate at least one second level classifier based on classified places or routes.

22. The apparatus of claim 21, wherein the at least one memory and the executable instructions being configured to, in cooperation with the at least one processor, cause the apparatus to generate the at least one second level classifier further comprises the at least one memory and the executable instructions being configured to, in cooperation with the at least one processor, cause the apparatus to generate n-grams based on a time series of classified places or routes and generate at least one second level classifier based on the n-grams, wherein each of the n-grams comprises n-elements and n is a positive integer.

23. The apparatus of claim 17, wherein to determine if the position information is in a classified place or route is a determination made based on an active first level classifier, and wherein the at least one memory and the executable instructions are further configured to, in cooperation with the at least one processor, cause the apparatus to deactivate the first level classifier; verify a detected state transition by reactivating the first level classifier in order to determine if the position information indicates that the apparatus is now in a different classified place or route; and feed results from the verification back to the second level classifier.

24. The apparatus of claim 23, wherein the at least one memory and the executable instructions are further configured to, in cooperation with the at least one processor, cause the apparatus to apply the new localization configuration in the apparatus based on the different classified place or route.

* * * * *